*INVENTOR.*
RAYMOND E. MILLER by Thomas & Crickenberger

United States Patent Office 3,183,491
Patented May 11, 1965

3,183,491

RECTANGULAR ARRAY CRYOGENIC STORAGE CIRCUITS USING INHIBITOR LOGIC

Raymond E. Miller, Yorktown Heights, N.Y., assignor to International Business Machines Corporation, New York, N.Y., a corporation of New York Filed Mar. 30, 1960, Ser. No. 18,691
2 Claims. (Cl. 340—173.1)

The present invention relates to inhibitor logic arrays, and more particularly to rectangular array storage circuits using inhibitor logic.

The circuitry required to carry out certain logical operations in computer applications may take the form of inhibitor logic arrays. These arrays are synthesized from the supernormal form of mathematical expressions defined as polynomial functions in terms of a plurality of variables. An array of conductive wires is assembled with one set of wires corresponding to the variables in the function and another set of wires corresponding to the terms in the function. At selected crossover points of the sets of wires in the rectangular array thus constructed, inhibitor elements are disposed in accordance with the particular functions being synthesized. When the array is then selectively energized in accordance with the values of the variables, the inhibitor elements serve to indicate the function value by inhibiting all except a desired line. The method of synthesizing these arrays is explained in detail in the copending application of Raymond E. Miller et al., entitled Inhibitor Logic Arrays, Serial No. 18,692, filed on March 30, 1960, and assigned to the assignee of the present application.

Such an array will retain the previous output until the lines for the variables in the function are again energized. When these lines are energized the previous output is no longer available. This is not always a disadvantage, but many times it is desirable to allow the variable lines of the array to be energized in input patterns other than those require to actuate a line corresponding to a term in the function. Under these circumstances it may also be desirable to have the output of the array remain at its previous value until a new term line is energized. In the circuits synthesized from the supernormal form a definite output is defined for each possible input pattern. The storage circuits to be described herein will have the additional feature that certain input patterns will have no effect on the circuit output, and for these input patterns the storage circuit output will remain at its previous value. When cryogenic elements are utilized as the components of the array, the drive currents required must remain in circulation at all times, and applying the inputs to the variable lines in a pattern not in accordance with the function represented would very likely both destroy the previous output of the array and block the drive current path.

A feature of this invention is the provision of a storage circuit using inhibitor logic that retains the previous output of an inhibitor logic array until the next term line of the function is energized. This circuit also provides an alternate conductive path for the drive currents in the array which is present for those input patterns which have no effect on the circuit output.

In accordance with the present invention this is accomplished by associating an inhibitor logic array representing a function or functions to be realized with a storage inhibitor logic array to retain the previous output of the function array until a new output is present from the function array. The output lines of the function array serve as the input to the storage array. Inhibitor elements are disposed in the storage array such that when the output of the storage array is being set it will assume an output condition identical to that of the function array. At least one input line to the storage array has no inhibitor elements so that an alternate path for the drive currents of the function array is provided. This enables the function array to be cycled through input conditions other than those of the functions to be realized without destroying the information in the storage array.

The invention may be understood readily by making reference to the accompanying drawings in which:

FIG. 1*a* is a symbolic representation of an inhibitor element;

FIG. 1*b* is a diagrammatic illustration of a cryotron element equivalent to the inhibitor of FIG. 1*a*;

Figure 1:
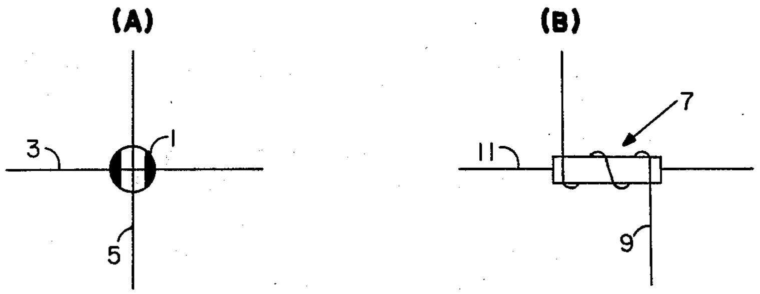

Referring now to the drawings, FIG. 1*a* illustrates an inhibitor element 1 having a type of storage capacity. The inhibitor element 1 has a pair of lines 3 and 5 passing therethrough. The inhibitor 1 is located at the crossover point or point of interaction of these two lines. In the arrangement shown, a signal on line 5 will inhibit a signal from appearing on line 3. If there is a signal on line 3, then this signal will remain until line 3 is inhibited by a signal appearing on line 5. The particular form of the inhibitor in the illustration has no physical significance and is used as a logic symbol only.

FIG. 1*b* shows a cryotron device which may be employed as the inhibitor element 1 of FIG. 1*a*. The cryotron 7 has a control winding 9 and a gate line 11. The gate line of the cryotron is constructed of a material which is in a superconductive state at the operating temperature of the cryotron in the absence of a magnetic field. The gate line is driven resistive (normal) by a magnetic field produced when a current greater than a predetermined minimum exists in its control winding 9. Thus, the cryotron utilizes the fact that the superconductive transition of a material depends upon both temperature and the applied electromagnetic field. The inherent characteristics of such a device enable it to perform switching and inhibiting functions which are readily adaptable to computer applications.

The cryotron 7 may be constructed of any suitable material having the required operating characteristics. The gate line must have the property of transferring from its superconductive to its normal state under the influence of a magnetic field, and the material lead has been found satisfactory for this application. The control winding 9 and the connections between the various components of associated circuitry (not shown) must be fabricated from a superconductor material which remains in its superconductive state under all conditions of circuit operation. An example of such a material is tin. The construction of the cryotron, together with the types of materials employed, may be understood more readily by referring to the article by Dudley A. Buck, "The Cryotron—A Superconductive Computer Component," Proceedings of the IRE, pp. 482–492, April 1956.

The use of inhibitor logic is particularly applicable to cryogenic circuits, and, therefore, the cryotron has been suggested as a suitable inhibitor device because the cryotron is a basic superconductive element. It will be understood, however, that other equivalent devices may be used as the inhibitor elements in the circuits constructed in accordance with the present invention.

The elementary inhibitor operation of the device of FIG. 1 can be extended to circuits constructed to carry out specialized logical operations. A convenient way of expressing these operations is in terms of Boolean functions. In order to utilize these Boolean functions in accordance with the invention they must be stated in disjunctive normal form. This means that the function is expressed as a disjunction of terms, each term of which is a conjunction of variables or their negations. In this form no variable can occur twice in any term. For example, the function $$f_1(a_1,a_2,a_3)=a_1a_2 \vee a_2\bar{a}_3$$

is in normal form, while the functions $$f_2(a_1,a_2,a_3)=a_1(a_2 \vee \bar{a}_3)$$

and $$f_3(a_1,a_2,a_3)=a_1a_2 \vee a_1a_3\bar{a}_3$$

are not.

Figure 2:
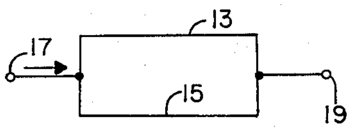
FIG. 2 is a diagrammatic illustration of a superconducting wire pair utilized in the present invention.

In order to apply the methematical theory to a practical circuit hardware approach it will be necessary to assume that any variable of the form $a_i$ (where $i$ indicates the particular variable), as well as the function value itself, may be indicated by a current in one of two wires. A pair of these wires are shown in FIG. 2 of the drawings and are labelled 13 and 15, respectively. In accordance with the principles of this invention these wires 13 and 15 are superconductors, and a current initiating at terminal 17 my exist in either wire 13 or wire 15, but not both. This is accomplished by controlling the conductivity of these wires by inhibitor elements such as shown in FIG. 1*a*. Thus, there is always current between points 17 and 19, but this current may be selectively diverted through either conductor 13 or 15.

In the synthesis of combinational circuits the Boolean functions are reduced to the supernormal form which is an expression of the function and the negation of the function in disjunctive normal form. For the more general case, however, consider two disjoint functions $f_1$ and $f_2$, where $f_1$ is the function for which the circuit must have a one output, and $f_2$ is the function for which the circuit must have a zero output. In the case of combinational circuits $f_2=\bar{f}_1$, but when $f_2 \neq \bar{f}_1$, the function $(\overline{f_1 \vee f_2})$ has a non-zero value for some values of the variables. Thus, it will be appreciated that if the circuit is to maintain its previous output when $(\overline{f_1 \vee f_2})=1$ then some means must be provided to store the function values and allow the continued existence of current in the circuit without destroying the stored information.

Figure 3:
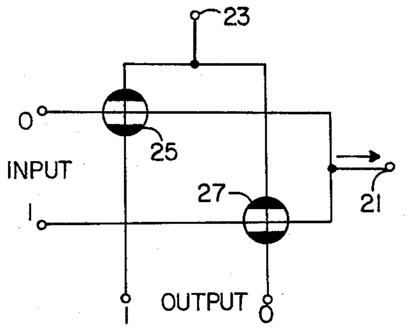
FIG. 3 is a diagram of a basic flip-flop device using inhibitor elements.

FIG. 3 shows a simple flip-flop circuit utilizing inhibitor logic. In this figure the zero and one input lines are coupled together with the direction of current being toward the common terminal 21 as shown by the arrow. The zero and one output lines are fed from a common terminal 23 in the direction shown by the arrow. An inhibitor element 25 is placed where the zero input line crosses the one output line, and an inhibitor element 27 is placed where the one input line crosses the zero output line. The flip-flop may be set to have a signal at the zero output or the one output by an appropriate input signal. An input signal on the zero line will inhibit the one output line so that a signal at terminal 23 will be inhibited from the one output line, but will be present at the zero output terminal. Similarly, a signal at the one input terminal will inhibit the zero output line such that a signal at terminal 23 will appear on the one output line only. If no signals appear at either input terminal, the flip-flop output remains unchanged from its previous output. It is not allowable to have signals appearing at both input terminals simultaneously.

Figure 4:
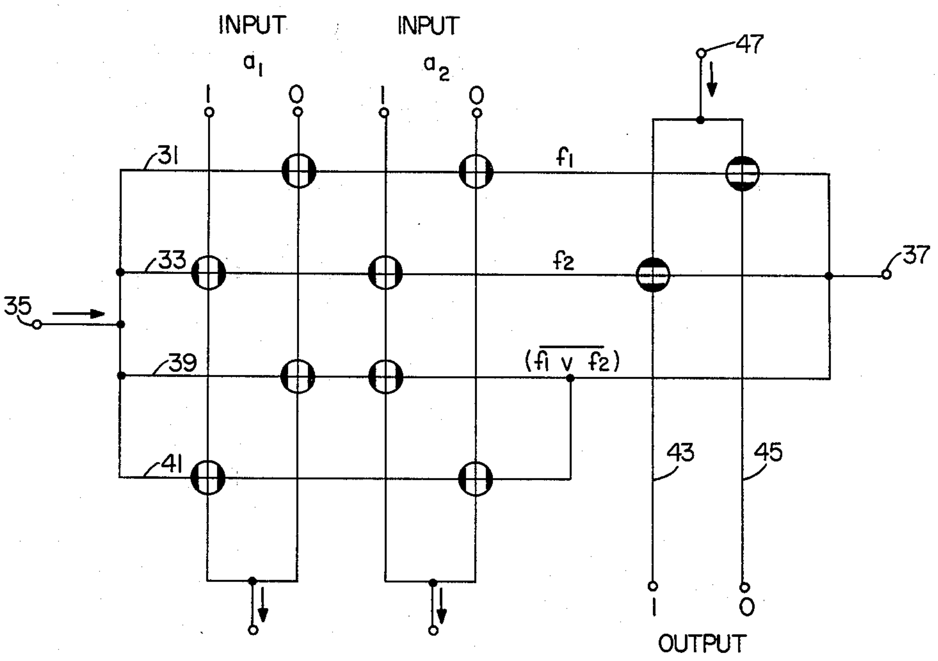
FIG. 4 is a diagram of an inhibitor array employing an output stage and alternate conductive paths for the driver current on the term lines.

The circuit of FIG. 3 can be incorporated in an inhibitor logic array to result in a circuit having the property of storage while allowing a complete conductive path to exist for all input patterns. FIG. 4 is an illustration of such a circuit. This circuit is a realization of the functions $f_1=a_1a_2$ and $f_2=\bar{a}_1\bar{a}_2$. For these functions, the function $(f_1 \vee f_2)=a_1\bar{a}_2 \vee \bar{a}_1a_2$. The procedure for constructing such a circuit is as follows:

(1) Reduce the functions $f_1$, $f_2$ and $(\overline{f_1 \vee f_2})$ to their minimum normal form (in this case they are already in the minimum normal form). The use of "don't care" conditions when they exist is implied in this minimization.

(2) For each of the variables $a_1$ and $a_2$ in $f_1$ and $f_2$ place a pair of lines in a vertical position.

(3) For each term in $f_1$, $f_2$ and $(\overline{f_1 \vee f_2})$ place a horizontal line crossing all of the pairs of vertical lines for the variables. In this case line 31 corresponds to the term $a_1a_2$ of $f_1$; line 33 corresponds to the term $\bar{a}_1\bar{a}_2$ of $f_2$; line 39 corresponds to the term $a_1\bar{a}_2$ of the function $(\overline{f_1 \vee f_2})$; and line 41 corresponds to the term $\bar{a}_1a_2$ of the function $(\overline{f_1 \vee f_2})$.

(4) Connect all of these horizontal lines together at the left end to be energized by a drive current from terminal 35. At the right end join together all lines representing terms within a function so that there will be the same number of lines as there are functions (in this case only the function $(\overline{f_1 \vee f_2})$ had more than one term line).

(5) Cross the three function lines with a pair of vertical lines connected together at the top to a common terminal 47. Line 43 forms the one output line and line 45 forms the zero output line. The three function lines 31, 33 and 39 which cross the output lines 43 and 45 are joined together at the right of the figure to a common terminal 37.

(6) Inhibitors are placed at the line crossings as follows. If the variable $a_i$ appears in the term place an inhibitor on the crossing where the term line crosses the zero side of the $a_i$ pair of lines. If the negation of the variable $a_i$ appears in the term, place an inhibitor on the crossing where the term line crosses the one side of the $a_i$ pair of lines. If $a_i$ or its negation does not appear in the term place no inhibitor at either crossing. Repeat this for each $a_i$ in each term.

(7) At the crossing of the extended horizontal line 31 representing $f_1$ (place an inhibitor at the crossing with line 45 representing the zero output. This inhibitor is placed so that a signal on the horizontal line inhibits a signal in the vertical line 45. Similarly, place an inhibitor on the one output line 43 at the crossing with the extended horizontal line 33 for $f_2$. Line 39 representing the negations of $f_1$ and $f_2$ has no inhibitors placed where it crosses the output lines.

It will be seen from this circuit that when the one side of variable inputs $a_1$ and $a_2$ are energized, lines 33, 39 and 41 will be inhibited, but there will be current from terminal 35 through line 31 to terminal 37. This current on line 31 inhibits line 45 of the output array thereby causing the current from terminal 47 to be diverted onto line 43 producing an output at the one output terminal. Similarly, when the zero sides of inputs $a_1$ and $a_2$ are energized, all horizontal lines except line 33 are inhibited and an output is produced on line 45 of the output array. For any condition other than the two discussed above, either line 39 or line 41 of the array will be energized. Since there are no inhibitor elements where the common line from these two lines crosses the output array, energizing either line 39 or line 41 will not change the output. Therefore, it will be appreciated that the circuit allows for all combinations of inputs without modifying the output except when a function line for $f_1$ or $f_2$ is energized, while providing a complete path for drive currents under any condition.

Figure 5:
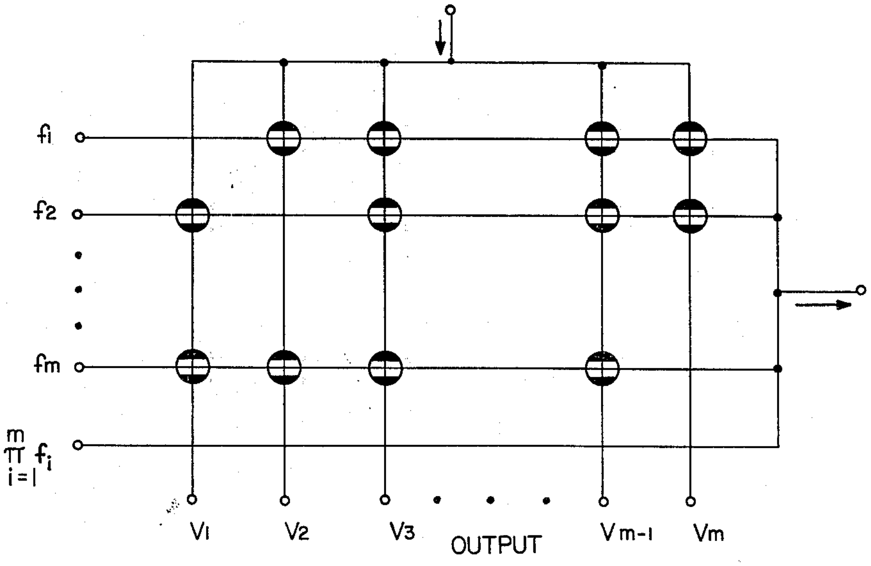
FIG. 5 is a diagram of a storage array showing how such an array may be extended to any number of functions.

The principles of operation explained in connection with FIG. 4 can be extended to storage circuits having $m$ values as shown in FIG. 5. The storage circuit may be controlled by $m$ functions. If the functions are $f_1$, $f_2 \ldots f_m$, then the functions which will be realized are $f_1, f_2 \ldots f_m$, and $\pi\bar{f}_i$. The output configuration is $m$ vertical wires. There is one vertical wire for each output value with inhibitors placed at all crossings for each horizontal function line $\bar{f}_i$ except the $i$th crossing. There are no inhibitors placed on the $$\prod_{i=1}^{m} \bar{f}_i$$

wire. A horizontal line is provided for each function realized. The normal form for the $f_i$ and $\pi\bar{f}_i$ functions for multivalued circuits will consist of V-polynomials having variables of the $a_i$ and $\bar{a}_i$ form.

Figure 6:
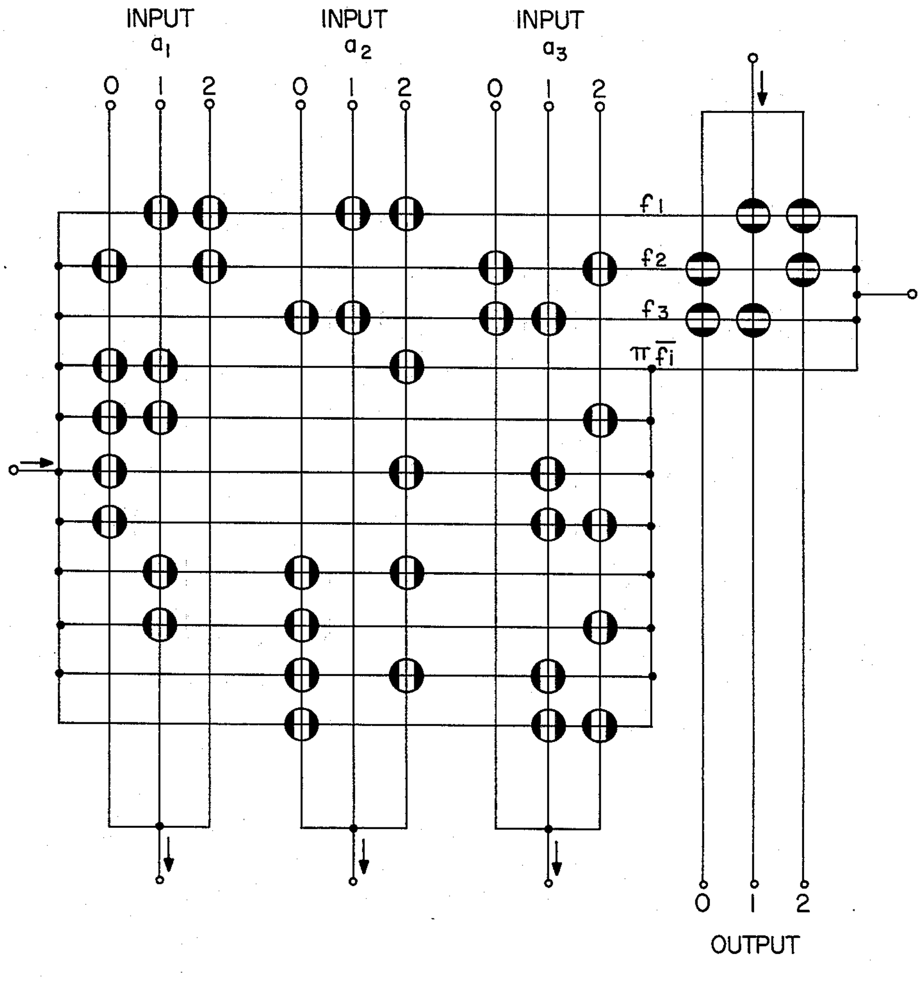
FIG. 6 is a diagram of a three-variable three-valued function array.

As demonstrated in FIG. 5, the storage circuits may take on more than two values. Similarly, the functions may have variables which take on more than two values (that is, other than binary). FIG. 6 is an illustration of a circuit having three variables $a_1$, $a_2$ and $a_3$, each having three values 0, 1 and 2. Let the functions $f_1$, $f_2$ and $f_3$ be $$f_1 = a_1^0 a_2^0$$

$$f_2 = a_1^1 a_3^1$$

$$f_3 = a_2^2 a_3^2$$

Here a variable $a_i^j$ means that variable $i$ takes on the value $j$, thus $f_1$ will take on the value 1 when $a_1=0$ and $a_2=0$ no matter what value $a_3$ assumes. Since it is necessary to form an expression for $$\prod_{i=1}^{3} \bar{f}_i$$

the $\bar{f}_i$'s can be expressed as $$\bar{f}_1 = a_1^{\bar{0}} \vee a_2^{\bar{0}}$$

$$\bar{f}_2 = a_1^{\bar{1}} \vee a_3^{\bar{1}}$$

$$\bar{f}_3 = a_2^{\bar{2}} \vee a_3^{\bar{2}}$$

The term $$a_1^{\bar{0}} \vee a_2^{\bar{0}}$$

means that $\bar{f}_1$ takes on the binary value 1 when $a_1$ is not equal to 0 or when $a_2$ is not equal to 0. Thus $$a_1^{\bar{0}} = a_1^1 \vee a_1^2$$

For the inhibitor circuits it is often convenient for the functions to have variables of the $$a_i^{\bar{j}}$$

form, since on the wire for a term containing an $$a_i^{\bar{j}}$$

one needs to place only one inhibitor at the crossing for $a_i=j$, and none at the other $a_i$ crossings. Expressing $\pi\bar{f}_i$ with $$a_i^{\bar{j}}\text{'s}$$

and expanding results in $$\prod_{i=1}^{m} \bar{f}_i = (a_1^{\bar{0}} \vee a_2^{\bar{0}})(a_1^{\bar{1}} \vee a_3^{\bar{1}})(a_2^{\bar{2}} \vee a_3^{\bar{2}})$$

$$= a_1^{\bar{0}} a_1^{\bar{1}} a_2^{\bar{2}} \vee a_1^{\bar{0}} a_1^{\bar{1}} a_3^{\bar{2}} \vee a_1^{\bar{0}} a_3^{\bar{1}} a_2^{\bar{2}}$$

$$\vee a_1^{\bar{0}} a_3^{\bar{1}} a_3^{\bar{2}} \vee a_2^{\bar{0}} a_1^{\bar{1}} a_2^{\bar{2}} \vee a_2^{\bar{0}} a_1^{\bar{1}} a_3^{\bar{2}}$$

$$\vee a_2^{\bar{0}} a_3^{\bar{1}} a_2^{\bar{2}} \vee a_2^{\bar{0}} a_3^{\bar{1}} a_3^{\bar{2}}$$

$$= a_1^2 a_2^{\bar{2}} \vee a_1^2 a_3^{\bar{2}} \vee a_1^{\bar{0}} a_2^{\bar{2}} a_3^{\bar{1}}$$

$$\vee a_1^{\bar{0}} a_3^0 \vee a_1^{\bar{1}} a_2^1 \vee a_1^{\bar{1}} a_2^{\bar{0}} a_3^{\bar{2}}$$

$$\vee a_2^1 a_3^{\bar{1}} \vee a_2^{\bar{0}} a_3^0$$

Thus it will be seen that the method of synthesis can be extended to any desired radix and the adaptation to the base 4 or higher bases would merely be a logical extension of the theory here presented and described. It will be understood that the normal forms utilized in synthesizing the circuitry should be in their minimum form, that is, the variables and terms should be simplified as much as possible to assure that the circuits synthesized will contain the least possible number of hardware components. The circuits constructed in accordance with the invention are particularly applicable to cryogenic operation, although it will be understood that the invention is not limited to cryogenic devices.

By means of this invention it is possible to provide logic arrays having the property of storage and the ability to handle a variety of input conditions without producing unwanted effects on the output.

What is claimed is:

1. A cryogenic inhibitor logic storage circuits for performing logical operations definable as polynomial functions in terms of at least one variable, the circuit comprising first and second rectangular arrays, said first array having a predetermined number of first superconductive lines for each of the variables selected in accordance with the radix employed, a plurality of second superconductive lines disposed in the first array for the terms in the polynomial functions and the negations of these functions, at least one of said second superconductive lines representing the terms in the negations of the polynomial functions, cryotron inhibitor means disposed at selected points of interaction of the lines representing the variables and the lines representing the terms, said second rectangular array having a plurality of output superconductive lines equal to the predetermined number of lines for the variables in the first array, the plurality of second superconductive lines for the terms forming a part of the second array, and cryotron inhibitor means disposed at selected points of interaction of the plurality of second superconductive lines for the terms of the functions and the output lines, whereby the output lines will retain a given pattern for all variable values other than certain predetermined values.

2. A cryogenic inhibitor logic storage circuit for performing logical operations definable as polynomial functions in terms of at least one variable, the circuit comprising first and second rectangular arrays, said first array having a predetermined number of first superconductive lines for each of the variables, a set of second superconductive lines for the terms in the polynomial functions, at least one additional second superconductive line for the terms in the negations of the polynomial functions, cryotron inhibitor means disposed at selected points of interaction of the lines representing the variables and the lines representing the terms, said second rectangular array having a plurality of output superconductive lines equal to the predetermined number of lines for the variables in the first array, the set of lines for the terms in the functions and the additional line for the terms in the negations of the functions forming a part of the second array, and cryotron inhibitor means disposed at selected points of interaction of the set of lines for the terms in the functions and the output lines, whereby the output lines will retain a given pattern for all variable values other than certain predetermined values.

References Cited by the Examiner

UNITED STATES PATENTS

| | | | |
|---|---|---|---|
| 2,691,153 | 10/54 | Rajchman | 340—166 |
| 2,734,184 | 2/56 | Rajchman | 340—166 |
| 2,832,897 | 4/58 | Buck | 340—173.1 |
| 2,959,688 | 11/60 | Buck | 340—173.1 |
| 3,011,711 | 12/61 | Buck | 340—173.1 |
| 3,047,230 | 7/62 | Anderson | 340—173.1 |

(Other references on following page)

OTHER REFERENCES

"Cryogenic Devices in Logical Circuitry and Storage," by J. W. Bremer, published in Electrical Manufacturing, February 1958.

"The Cryotron-A Superconductive Computer Component," by D. A. Buck, published in Proceedings of the IRE, April 1956.

IRVING L. SRAGOW, *Primary Examiner.*

EVERETT R. REYNOLDS, *Examiner.*